(12) United States Patent
Takatsuka et al.

(10) Patent No.: US 7,635,192 B2
(45) Date of Patent: Dec. 22, 2009

(54) POINTER HAVING A CURVED REFLECTIVE SURFACE

(75) Inventors: Motohiro Takatsuka, Shizuoka (JP); Masaaki Nakamura, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 259 days.

(21) Appl. No.: 11/193,360

(22) Filed: Aug. 1, 2005

(65) Prior Publication Data

US 2006/0039130 A1 Feb. 23, 2006

(30) Foreign Application Priority Data

Aug. 18, 2004 (JP) ............... 2004-238188

(51) Int. Cl.
*G01D 11/28* (2006.01)
(52) U.S. Cl. .................. 362/26; 362/559; 362/600; 340/815.78
(58) Field of Classification Search ............ 340/815.78, 340/815.86, 815.79, 438, 441; 116/284, 116/286, 287, 288, DIG. 5, DIG. 6, DIG. 36
See application file for complete search history.

(56) References Cited

U.S. PATENT DOCUMENTS

| | | | | |
|---|---|---|---|---|
| 3,129,691 A | * | 4/1964 | Walker | 116/328 |
| 4,218,726 A | * | 8/1980 | Fukasawa et al. | 362/23 |
| 4,860,170 A | * | 8/1989 | Sakakibara et al. | 362/26 |
| 4,959,759 A | * | 9/1990 | Kohler | 362/489 |
| 5,678,913 A | * | 10/1997 | Ishimaru et al. | 362/26 |
| 5,797,345 A | * | 8/1998 | Evans et al. | 116/286 |
| 5,806,954 A | * | 9/1998 | Butt et al. | 362/26 |
| 5,829,861 A | * | 11/1998 | Carter et al. | 362/29 |
| 5,911,492 A | * | 6/1999 | Perry et al. | 362/26 |
| 5,915,822 A | * | 6/1999 | Ogura et al. | 362/26 |
| 5,983,827 A | * | 11/1999 | Cookingham et al. | 116/288 |
| 6,032,608 A | * | 3/2000 | Oreans et al. | 116/288 |
| 6,070,549 A | * | 6/2000 | Iuchi et al. | 116/287 |
| 6,338,561 B1 | * | 1/2002 | Ikarashi | 362/26 |

(Continued)

FOREIGN PATENT DOCUMENTS

DE 28 48 001 5/1979

(Continued)

OTHER PUBLICATIONS

Official Action received from the German Patent and Trademark Office regarding corresponding German Patent Application No. 10 2005 038 626.1-41, dated Sep. 22, 2008.

*Primary Examiner*—Gunyoung T Lee
(74) *Attorney, Agent, or Firm*—Finnegan, Henderson, Farabow, Garrett & Dunner, L.L.P.

(57) ABSTRACT

A pointer comprises an attached portion and a main body. The attached portion is attached to an instrument. The main body is fixed to the attached portion at a basic portion thereof and extending toward a free portion thereof. The main body has a reflective surface and a foil-stamping layer. The reflective surface is formed at an inclined surface of the basic portion and inclined to a traveling direction of light entering the main body. The foil-stamping layer is formed on a bottom surface of the main body and diffusely reflects light reflected by the reflective surface. The reflective surface is curved like a collective convex lens in a transverse direction of the inclined surface and a diffusive concave lens in a vertical direction of the inclined surface.

7 Claims, 6 Drawing Sheets

U.S. PATENT DOCUMENTS

| | | | |
|---|---|---|---|
| 6,955,438 B2 * | 10/2005 | Ishii | 362/29 |
| 6,957,901 B2 * | 10/2005 | Schach et al. | 362/489 |
| 7,021,790 B2 * | 4/2006 | Parsons | 362/191 |
| 7,163,303 B1 * | 1/2007 | Venkatram | 362/26 |
| 2003/0079672 A1 * | 5/2003 | Kalashnikov et al. | 116/288 |
| 2004/0070964 A1 * | 4/2004 | Lo | 362/29 |

FOREIGN PATENT DOCUMENTS

JP     11-194040     7/1999

* cited by examiner

POINTER HAVING A CURVED REFLECTIVE SURFACE

CROSS REFERENCE TO RELATED APPLICATION

This application claims benefit of priority under 35 U.S.C. § 119 to Japanese Patent Application No. 2004-238188, filed on Aug. 18, 2004, the entire contents of which are incorporated by reference herein.

BACKGROUND OF THE INVENTION

1. Field of the Invention

The present invention relates to a pointer that is employed in an instrument which is mounted on a vehicle, an airplane, a ship, etc.

2. Description of the Related Art

A self-luminous pointer is widely used as a pointer employed in an instrument. A conventional self-luminous pointer is disclosed in Japanese Unexamined Patent Publication No. H11-194040.

Figure 1:
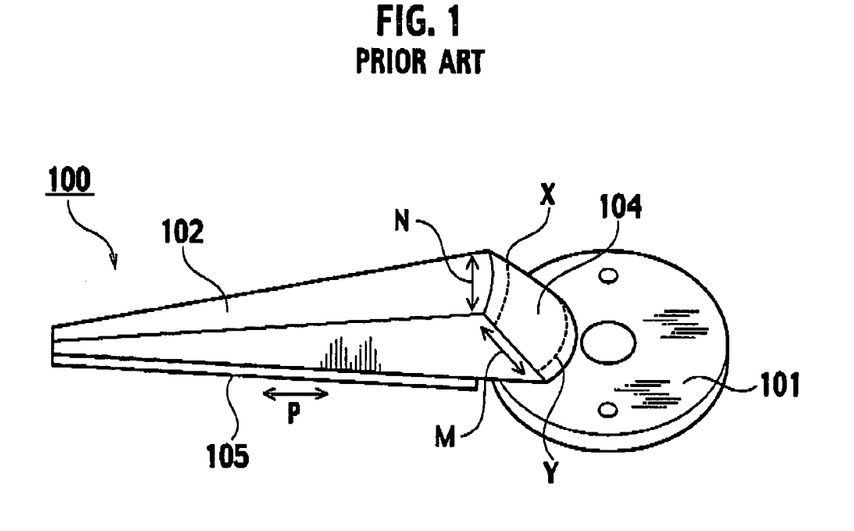
FIG. 1 is a perspective view of a conventional pointer.

As shown in FIG. 1, a pointer 100 comprises an attached portion 101 and a tapered main body 102. The attached portion 101 is attached to a rotary shaft of an instrument (not shown). The main body 102 is fixed to the attached portion 101 at a basic portion thereof and extends toward a free portion thereof. The attached portion 101 and the main body 102 are made of light transmission members.

Figure 2:
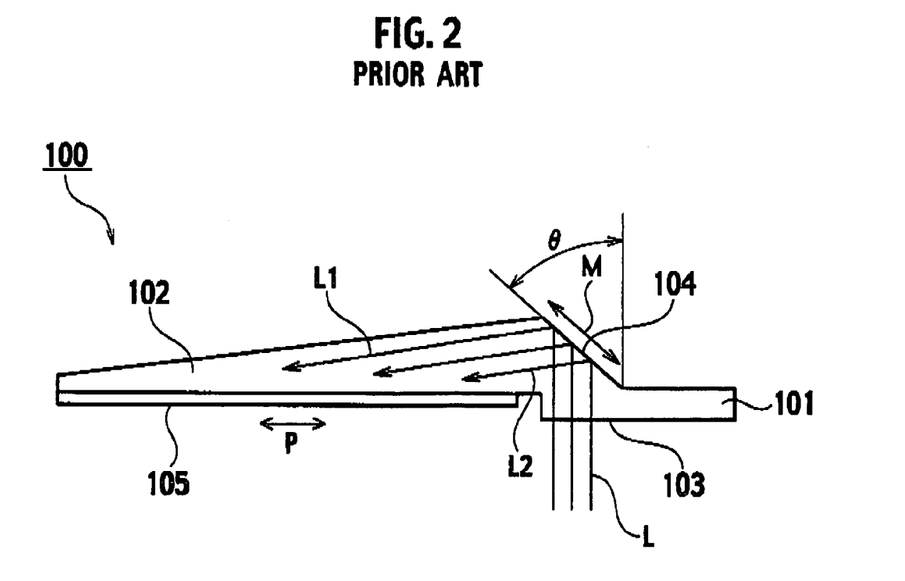
FIG. 2 is a vertical cross-sectional view of the conventional pointer.

As shown in FIG. 2, an entrance face 103 is formed at a bottom of the basic portion of the main body 102. Light emitted from a light source (not shown) enters the main body 102 through the entrance face 103. A reflective surface 104 is formed at an inclined side of the basic portion of the main body 102. The reflective surface 104 is inclined at a θ degree angle relative to a traveling direction of light entering the main body 102.

Figure 3:
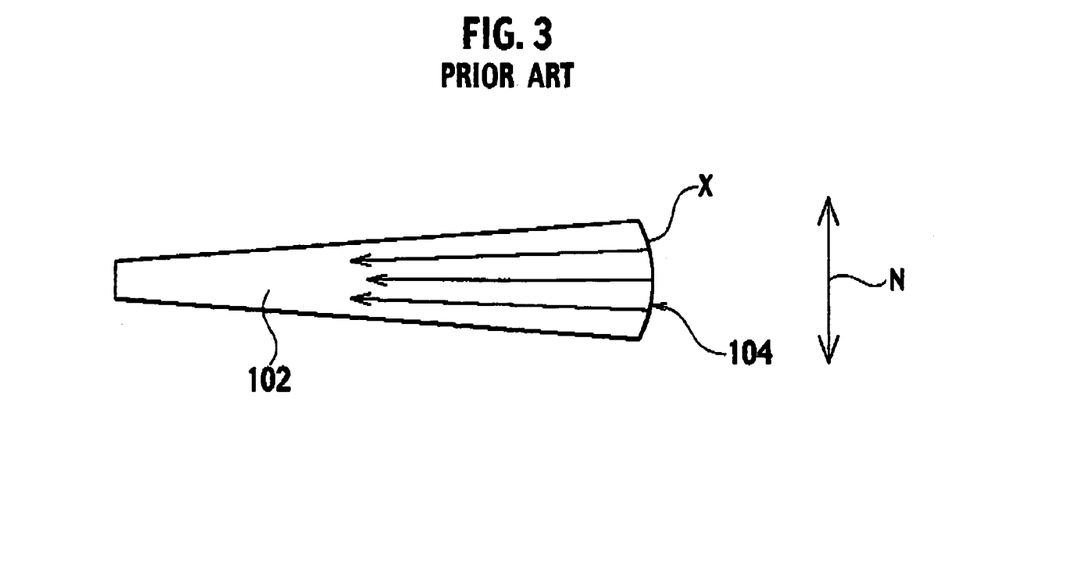
FIG. 3 is a transverse cross-sectional view illustrating a path of light reflected by a reflective surface of the conventional pointer on an upper end region (X shown in FIG. 1) of the reflective surface.
Figure 4:
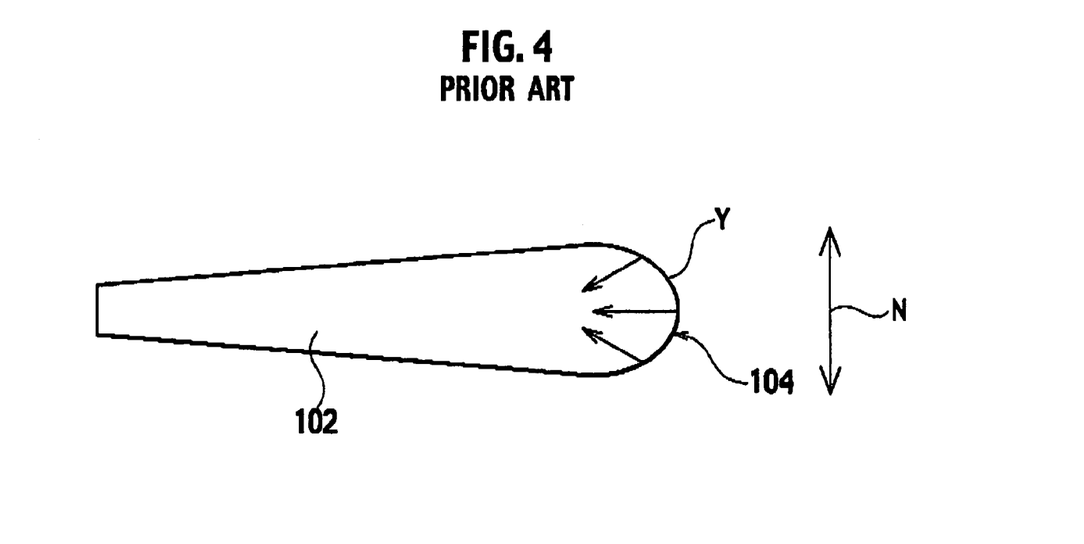
FIG. 4 is a transverse cross-sectional view illustrating a path of light reflected by the reflective surface of the conventional pointer on a lower end region (Y shown in FIG. 1) of the reflective surface.

The reflective surface 104 is curved like a collective convex lens in a transverse direction N. The reflective surface 104 extends straight in an inclined direction M. The transverse direction N is perpendicular to the inclined direction M. The collective convex lens has the smallest curvature at an upper end of the reflective surface 104 (see FIG. 3) and the largest curvature at a lower end of the reflective surface 104 (see FIG. 4). A curvature of the collective convex lens successively changes between the upper and lower ends.

A foil-stamping layer 105 is formed on a bottom surface of the main body 102. The foil-stamping layer 105 is colored and serves as a light diffusion surface.

In the above structure, light L enters the main body 102 through the entrance face 103 and then is reflected by the reflective surface 104. Light L1 reflected on an upper end region of the reflective surface 104 goes straight ahead in main body 102 and then is diffusely reflected by the foil-stamping layer 105. Also, light L2 reflected on a lower end region of the reflective surface 104 goes straight ahead in main body 102 and then is diffusely reflected by the foil-stamping layer 105. Therefore, the light L1 and the light L2 evenly lighten the main body 102. As a result, an operator can recognize the pointer 100 clearly.

However, the pointer 100 is very sensitive to the oblique angle θ relative to the traveling direction of light entering the main body 102. More specifically, if the oblique angle θ is large, light reflected by the reflective surface 104 collects in the vicinity of the basic portion of the main body 102. In contrast, if the oblique angle θ is small, light reflected by the reflective surface 104 collects in the vicinity of the free portion of the main body 102. Therefore, it is hard to adjust the oblique angle θ such that the light reflected by the reflective surface 104 evenly lighten the main body 102. This leads to a poor handling.

SUMMARY OF THE INVENTION

The object of the present invention is to provide a pointer configured to be easily and efficiently lightened by light emitted from a light source without generating uneven light strength therein.

In order to achieve the above object, the present invention provides a pointer comprising: an attached portion to be attached to an instrument and a main body fixed to the attached portion at a basic portion thereof and extending toward a free portion thereof, the main body having a reflective surface which is formed on a side surface of the main body and inclined to a traveling direction of light entering the main body and a light diffusion surface which is formed on a bottom surface of the main body and diffusely reflects light reflected by the reflective surface, wherein the reflective surface is curved like a collective convex lens in a transverse direction of the side surface and a diffusive concave lens in a vertical direction of the side surface.

According to the present invention, the reflected light arrives at the whole light diffusion surface without leaking outside and then is diffusely reflected by the whole light diffusion surface to evenly and efficiently lighten the main body. Therefore, the pointer can be easily and efficiently lightened without generating uneven light strength therein.

In a preferred embodiment of the present invention, the pointer further comprises a protrusion portion connected to the basic portion. The protrusion portion has a first side surface forming one end of the reflective surface and a second side surface forming a sub-reflective surface which reflects a part of light reflected by the reflective surface toward one area of the light diffusion surface being located in the vicinity of the basic portion.

According to the embodiment, the reflected light arrives at one distal side of the light diffusion surface being located at the basic portion side of the main body. Therefore, the pointer can be easily and efficiently lightened without generating uneven light strength therein.

In a preferred embodiment of the present invention, the main body has an entrance surface formed on a bottom surface of the basic portion. Light emitted from a light source enters the main body through the entrance surface.

According to the embodiment, the light emitted from the light source easily and efficiently enters the main body through the entrance surface. Therefore, the pointer can be easily and efficiently lightened.

In a preferred embodiment of the present invention, a curvature of the collective convex lens is constant.

According to the embodiment, the reflected light arrives at the light diffusion surface without leaking outside and then is diffusely reflected by the light diffusion surface to evenly and efficiently lighten the main body. Therefore, the pointer can be easily and efficiently lightened without generating uneven light strength therein.

In a preferred embodiment of the present invention, a curvature of the collective convex lens successively changes.

According to the embodiment, the reflected light arrives at the light diffusion surface without leaking outside and then is diffusely reflected by the light diffusion surface to evenly and efficiently lighten the main body. Therefore, the pointer can be easily and efficiently lightened without generating uneven light strength therein.

In a preferred embodiment of the present invention, the light diffusion surface is formed by a foil-stamping layer.

According to the embodiment, the light reflected by the reflective surface can be diffusely reflected by the light diffusion surface easily and efficiently.

In a preferred embodiment of the present invention, the light diffusion surface is formed by coinjection molding process.

According to the embodiment, the light reflected by the reflective surface can be diffusely reflected by the light diffusion surface easily and efficiently.

DESCRIPTION OF THE PREFFERED EMBODIMENT

Hereinafter, with reference to FIGS. 5 to 10, an embodiment of the present invention will be described.

Figure 5:
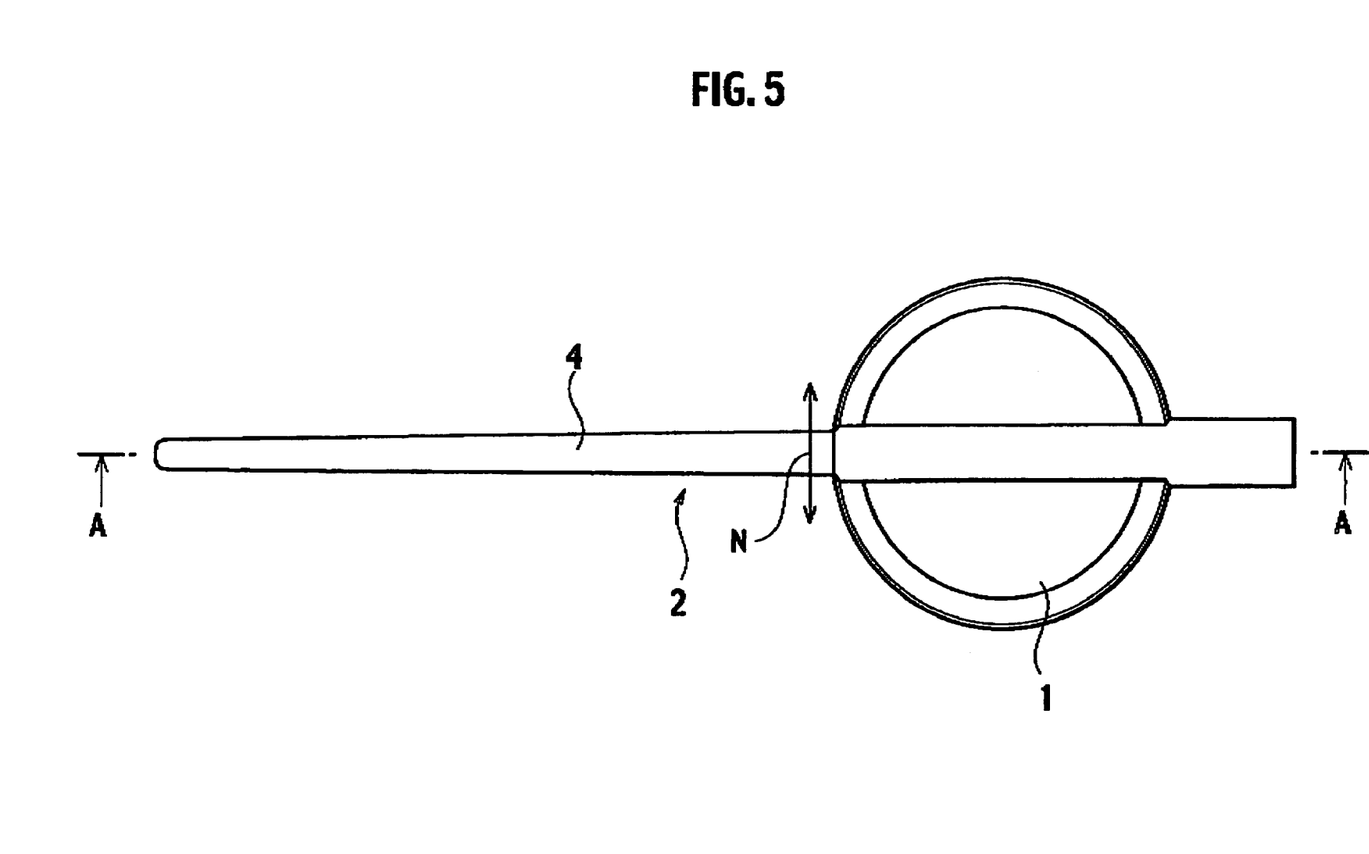
FIG. 5 is a plain view of a pointer cap and a pointer according to an embodiment of the present invention.
Figure 6:
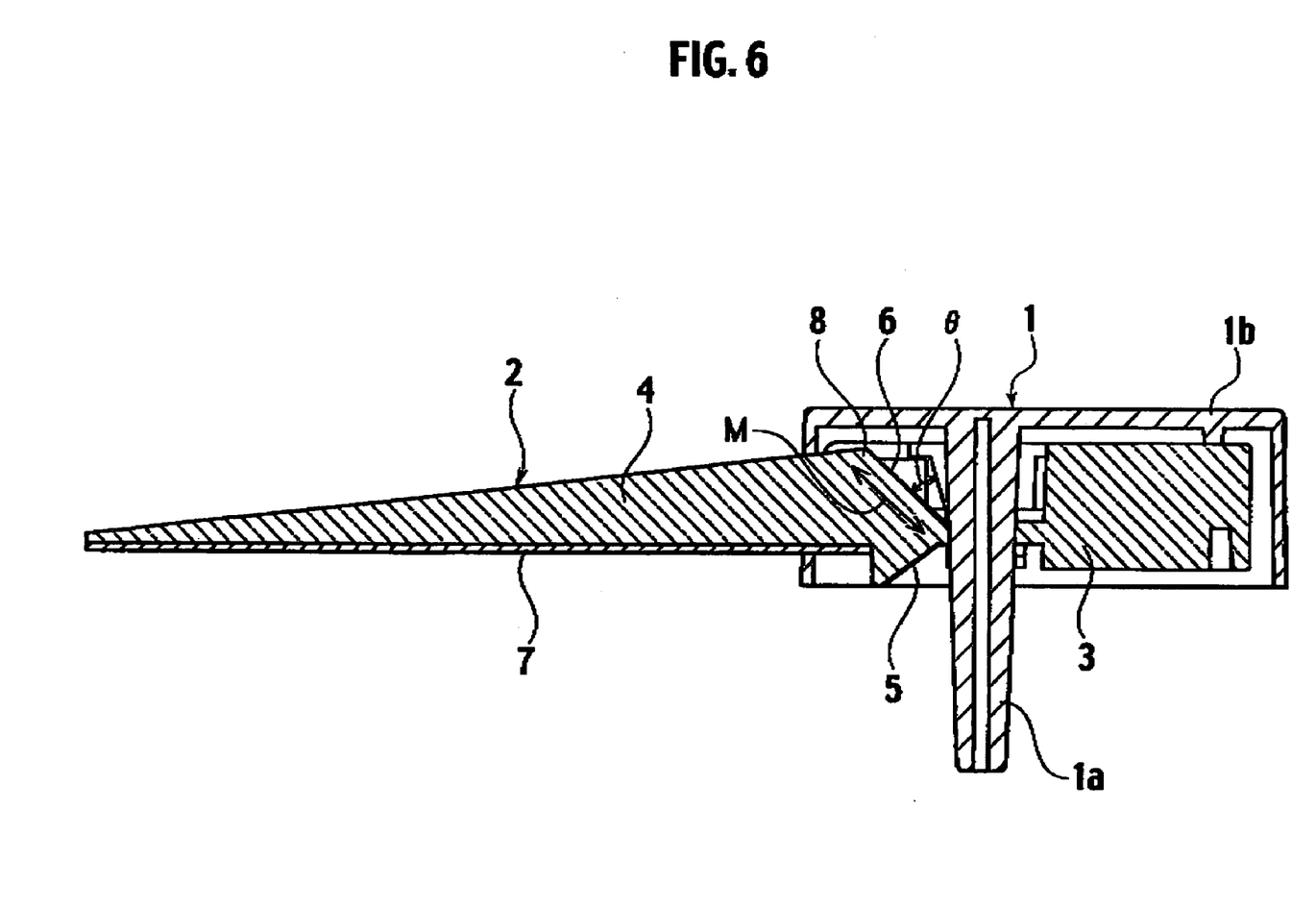
FIG. 6 is a cross-sectional view of the pointer cap and the pointer along a line A-A shown in FIG. 5.

As shown in FIGS. 5 and 6, a pointer cap 1 has a screw portion 1a and a column-shaped housing 1b. The screw portion 1a is fixed to an upper end of the housing 1b and projects downward from the housing 1b. The pointer cap 1 is fixed to a drive shaft of an instrument (not shown) by means of the screw portion 1a.

A pointer 2 rotates with the pointer cap 1 around the screw portion 1a by a rotation of the drive shaft. The pointer 2 comprises an attached portion 3 and a tapered main body 4.

Figure 7:
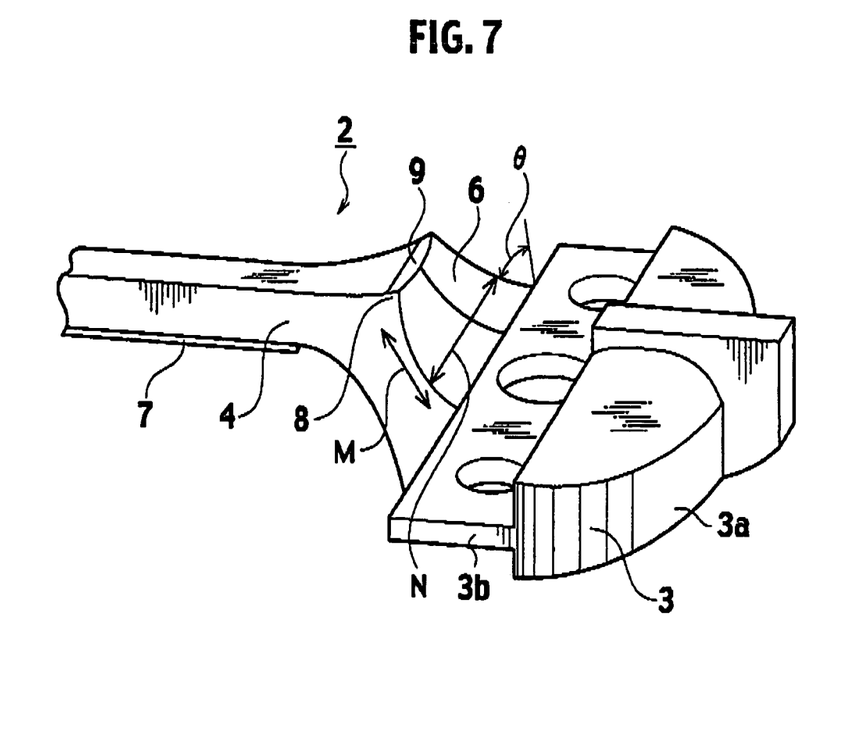
FIG. 7 is a perspective view of a substantial part of the pointer according to the embodiment of the present invention.

The housing 1b accommodates the attached portion 3. As shown in FIG. 7, the attached portion 3 has a half-column region 3a and a plane region 3b. The half-column region 3a is fixed to the plane region 3b at a side face thereof. The plane region 3b has a right hole, a left hole and a central hole. The screw portion 1a is inserted into the central hole (see FIG. 6). Thereby, the attached portion 3 is attached to the pointer cap 1. The attached portion 3 is made of a light transmission member.

The main body 4 is fixed to the plane region 3b of the attached portion 3 at a basic portion thereof and extends toward a free portion thereof. The main body 4 is made of a light transmission member.

An entrance face 5 is formed at a bottom of the basic portion of the main body 4. The entrance face 5 inclines to a bottom surface of the main body 4. Light emitted from a light source (not shown) enters the main body 4 through the entrance face 5. A reflective surface 6 is formed at an inclined side of the basic portion of the main body 4. The reflective surface 6 is substantially inclined at a θ degree angle relative to a traveling direction of light entering the main body 4. The inclined angle θ is set an angle equal to and more than a critical angle, that is an angle in which light entering the main body 4 is reflected totally.

Figure 8:
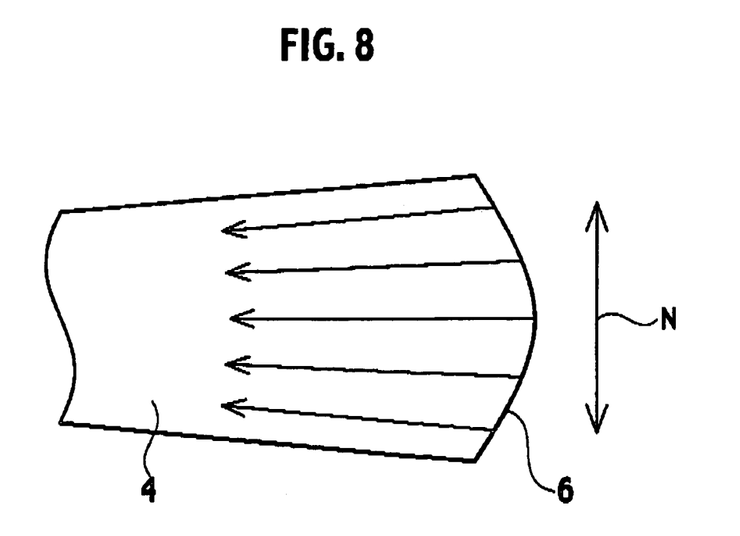
FIG. 8 is a transverse cross-sectional view illustrating a path of light reflected by a reflective surface of the pointer according to the embodiment of the present invention.

As shown in FIG. 8, the reflective surface 6 is curved like a collective convex lens in a transverse direction N such that the reflective surface 6 gradually protrudes from the main body 4, from both sides to a center portion thereof in the transverse direction N. The collective convex lens is symmetric in the transverse direction N.

Figure 9:
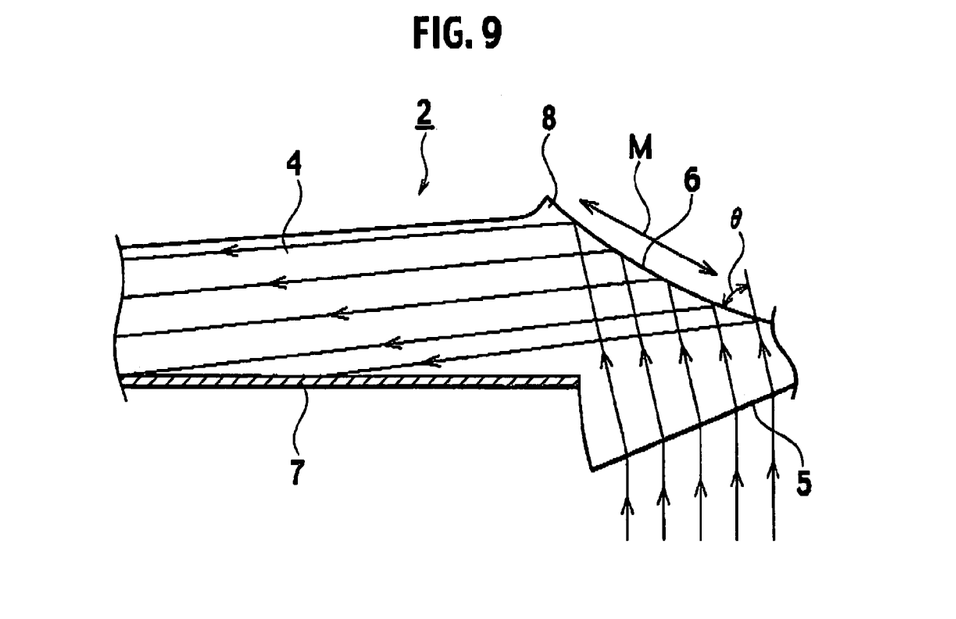
FIG. 9 is a vertical cross-sectional view illustrating a path of light entering the pointer and then reflected by the reflective surface of the pointer.

In contrast, as shown in FIG. 9, the reflective surface 6 is curved like a diffusive concave lens in an inclined direction M such that the reflective surface 6 gradually dents in the main body 4, from an upper and lower ends to a center portion thereof in the inclined direction M. The diffusive concave lens is symmetric in the inclined direction M. It is noted that the transverse direction N is perpendicular to the inclined direction M.

A foil-stamping layer 7 is formed on the bottom surface of the main body 4. The foil-stamping layer 7 is colored and serves as a light diffusion surface.

Figure 10:
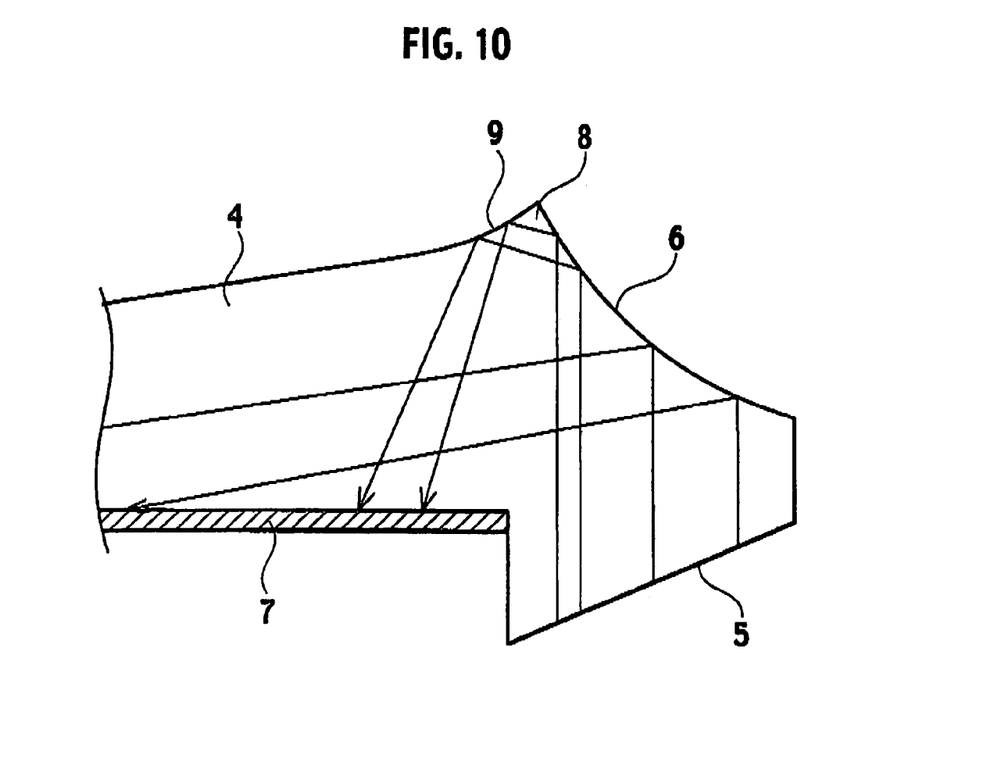
FIG. 10 is an enlarged vertical cross-sectional view illustrating a path of light entering the pointer and then reflected by the reflective surface and a sub-reflective surface of the pointer.

As shown in FIG. 10, a protrusion portion 8 is formed at an upper end of the baste portion of the main body 4. The protrusion portion 8 has one side face forming the upper end of the reflective surface 6 and the other side face forming a sub-reflective surface 9. The sub-reflective surface 9 reflects a part of light reflected by the reflective surface 6 toward one area of the foil-stamping layer 7 being located in the vicinity of the entrance face 5

In the above structure, light enters the main body 4 through the entrance face 5 and then is reflected by the reflective surface 6 and the sub-reflective surface 9. The reflected light goes straight ahead in the main body 4 and then is diffusely reflected by the foil-stamping layer 7. Therefore, the diffusely-reflected light evenly and efficiently lightens the main body 4.

The pointer 2 has main advantageous features as follows.

Since the reflective surface 6 is curved like a collective convex lens in the transverse direction N, the reflected light goes straight ahead in the main body 4 while gradually collecting toward a center portion of the main body 4 in the transverse direction N (see FIG. 8). This allows the reflected light to arrive at the foil-stamping layer 7 without leaking outside.

Further, since the reflective surface 6 is curved like a diffusive concave lens in the inclined direction M, the reflected light goes straight ahead in the main body 4 while gradually diffusing toward an upper and lower portion of the main body 4 in the inclined direction M (see FIG. 9). This allows the reflected light to arrive at one distal end of the foil-stamping layer 7 being located at the free portion side of the main body 4.

Furthermore, since the protrusion portion 8 is formed at the upper end of the basic portion of the main body 4 so that the sub-reflective surface 9 is opposed to the reflective surface 6, a part of the reflected light is reflected by the sub-reflected surface 9 to go straight ahead toward one area of the foil-stamping layer 7 being located in the vicinity of the entrance face 5. This allows the reflected light to arrive at the other distal end of the foil-stamping layer 7 being located at the basic portion side of the main body 4.

Therefore, the pointer 2 is less sensitive to the oblique angle θ than the conventional pointer. This leads to an easy handling and realizes a pointer configured to be easily and efficiently lightened by light emitted from a light source without generating uneven light strength therein.

Although a curvature of the collective convex lens is set to be constant in this embodiment, the curvature may be set to be successively changed between the upper and lower ends of the reflective surface 6.

Although a light diffusion surface is formed on the bottom surface of the main body 4 by the foil-stamping layer 7, the light diffusion surface may be formed by printing or coinjection molding process,

What is claimed is:

1. A pointer, comprising:

an attached portion attached to an instrument;

a main body fixed to the attached portion at a basic portion and extending toward a free portion thereof, the main body having a reflective surface formed on an inclined side of the basic portion, a light diffusion surface formed on a bottom surface of the main body which diffusely reflects the light reflected by the reflective surface, and a sub-reflective surface opposed to the reflective surface which reflects a portion of the light reflected by the reflective surface toward an area of the light diffusion surface; and a protrusion portion formed at an upper end of the basic portion of the main body, wherein the reflective surface has a curved shape of a collective convex lens in a transverse direction of a side surface of the main body and a curved shape of a diffusive concave lens in a vertical direction of the side surface of the main body, and wherein one side of the protrusion portion forms an upper end of the reflective surface.

2. The pointer according to claim 1, further comprising:

a protrusion portion connected to the basic portion, the protrusion portion having a first side surface forming one end of the reflective surface and a second side surface forming a sub-reflective surface which reflects a portion of the light reflected by the reflective surface toward one area of the light diffusion surface located in a vicinity of the basic portion.

3. The pointer according to claim 1, wherein the main body has an entrance surface formed on a bottom surface of the basic portion, and the light emitted from a light source enters the main body through the entrance surface.

4. The pointer according to claim 1, wherein a curvature of the collective convex lens is constant.

5. The pointer according to claim 1, wherein a curvature of the collective convex lens successively changes.

6. The pointer according to claim 1, wherein the light diffusion surface is formed by a foil-stamping layer.

7. The pointer according to claim 1, wherein the light diffusion surface is formed by a coinjection molding process.

* * * * *